United States Patent
Govindarajan et al.

(10) Patent No.: US 7,263,552 B2
(45) Date of Patent: Aug. 28, 2007

(54) METHOD AND APPARATUS FOR DISCOVERING NETWORK TOPOLOGY

(75) Inventors: Priya Govindarajan, Hillsboro, OR (US); David M. Durham, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1023 days.

(21) Appl. No.: 09/822,539

(22) Filed: Mar. 30, 2001

(65) Prior Publication Data

US 2002/0143905 A1 Oct. 3, 2002

(51) Int. Cl.
*G06F 15/173* (2006.01)
(52) U.S. Cl. ............... 709/224; 370/254; 370/255
(58) Field of Classification Search ........ 709/220, 709/223, 238, 242, 250, 224; 370/254–258
See application file for complete search history.

(56) References Cited

U.S. PATENT DOCUMENTS

| | | | | |
|---|---|---|---|---|
| 5,675,741 A | * | 10/1997 | Aggarwal et al. | 709/242 |
| 5,835,720 A | * | 11/1998 | Nelson et al. | 709/224 |
| 6,170,009 B1 | * | 1/2001 | Mandal et al. | 709/223 |
| 6,182,136 B1 | * | 1/2001 | Ramanathan et al. | 709/224 |
| 6,205,122 B1 | * | 3/2001 | Sharon et al. | 370/254 |
| 6,286,038 B1 | * | 9/2001 | Reichmeyer et al. | 709/220 |
| 6,507,646 B1 | * | 1/2003 | Fishler | 379/215.01 |
| 2001/0019554 A1 | * | 9/2001 | Nomura et al. | 370/389 |
| 2002/0091819 A1 | * | 7/2002 | Melchione et al. | 709/224 |

OTHER PUBLICATIONS

Govindan et al., "Heuristics for Internet Map Discovery", IEEE Infocom 2000, Mar. 28, 2000, pp. 1-11.

* cited by examiner

*Primary Examiner*—Kim Huynh
*Assistant Examiner*—Eron Sorrell
(74) *Attorney, Agent, or Firm*—Blakely, Sokoloff, Taylor & Zafman LLP

(57) ABSTRACT

A method and apparatus are provided that allow the automatic discovery of the topology of a network. In one embodiment, the invention includes identifying a second network device at a first network device, sending a message from the first network device to the second network device, the message establishing the identity of any network device between the first network device and the second network device, and compiling the established identities to determine the topology of the network. The invention can use PING and Traceroute utilities to find nodes and identify network devices.

19 Claims, 3 Drawing Sheets

METHOD AND APPARATUS FOR DISCOVERING NETWORK TOPOLOGY

BACKGROUND OF THE INVENTION

1. Field of the Invention

The present invention relates generally to the field of computer network management. More particularly, the invention relates to determining the topology of a network using devices distributed in different locations on the network.

2. Description of the Related Art

Any networked domain will typically have a number of devices responsible for routing the traffic around the network. Typically, the devices are routers or computers that support layer 2 (data link layer of the ISO's (International Standards Organisation's) OSI (Open System Interconnection) standard for networking) and layer 3 (network layer of OSI). In order to survive a failure of any one device or link, a network is typically designed with redundant back-up routes. Some networks can have multiple interconnected back-up routes. Over time, devices can be moved, added, removed or replaced, routes can be moved or altered and device configurations can be changed. As a result, any documentation of the original network design, if it was created, becomes outdated. When problems occur, troubleshooting is made more difficult without accurate information on the network's topology. When new demands are to be applied to the network, it may not be possible to determine how to reconfigure the network without knowledge of the network's existing topology. When performance is to be measured or improved, it is difficult to determine how develop the network without understanding all of the links and which devices are connected to each one.

Some devices are supplied with mechanisms that allow them to determine their connections. These mechanisms might allow someone to determine the connections at each device, compile the information together and, from there, determine the network's design. However, these mechanisms typically require that all of the devices use the same mechanism and do not enable the devices to communicate with each other to compile the information.

PING (Packet Internet Groper) is supported by a large number of different network devices. For those systems that do not support PING, there are many freeware and shareware utilities available for many different platforms that will support PING. PING sends an ICMP (Internet Control Message Protocol) packet to a specified address and waits for a reply. If a reply is received, then a connection to the addressed device is confirmed. However, PING does not determine connections to devices for which it does not know an address nor does PING determine the routing that was used to get to a device.

Traceroute is a utility that is available in many forms to operate on many different devices. UNIX and most Windows operating systems include a Traceroute utility. It is typically used to trace out packet routes through Internet connections. Traceroute traces the route that a packet sent from one device to another takes, shows how many hops the packet takes, and identifies the device at each hop. The identified devices at each hop are typically the routers. Traceroute operates by sending packets with low TTL (time-to-live) fields. When the packet does not reach its destination because the number of hops exceeds the TTL value, the last host that the packet did reach returns the packet and identifies itself. Traceroute sends a series of packets and increments the TTL of each one. Each failed packet is returned with an identification of the next host. By sending the of packets, the identity of the device at each host on the way to the destination can be determined. Traceroute can be used to determine the routers on the way to a particular destination but it does not determine back-up routes, alternative paths nor the topology of the network. It is also dependent on the particular path that a packet takes at the time that the utility is run. Accordingly, the information that can be obtained is very limited.

DESCRIPTION OF THE SEVERAL VIEWS OF THE DRAWINGS

The appended claims set forth the features of the invention with particularity. The present invention is illustrated by way of example, and not by way of limitation, in the figures of the accompanying drawings in which like reference numerals refer to similar elements and in which:

DETAILED DESCRIPTION OF THE INVENTION

The present invention can be implemented by using PING and Traceroute at sources distributed throughout a network and then piecing all of the collected information together to determine the overall topology of the network. The PING and Traceroute sources will be called Smartlinks. They respond to policies sent to them from a designated central server. In brief, the Smartlinks register themselves to the server and the server then sends policies to each of the Smartlinks. The Smartlinks execute the policies by running Traceroutes to each other. This allows them to identify all of the hosts that are between each Smartlink. This information is then sent to the central policy server which compiles the reports from each Smartlink to determine the topology of all of the network that is within the Smartlinks. The server can then render the topology in the form of lists, charts, graphs or a database.

Figure 1:
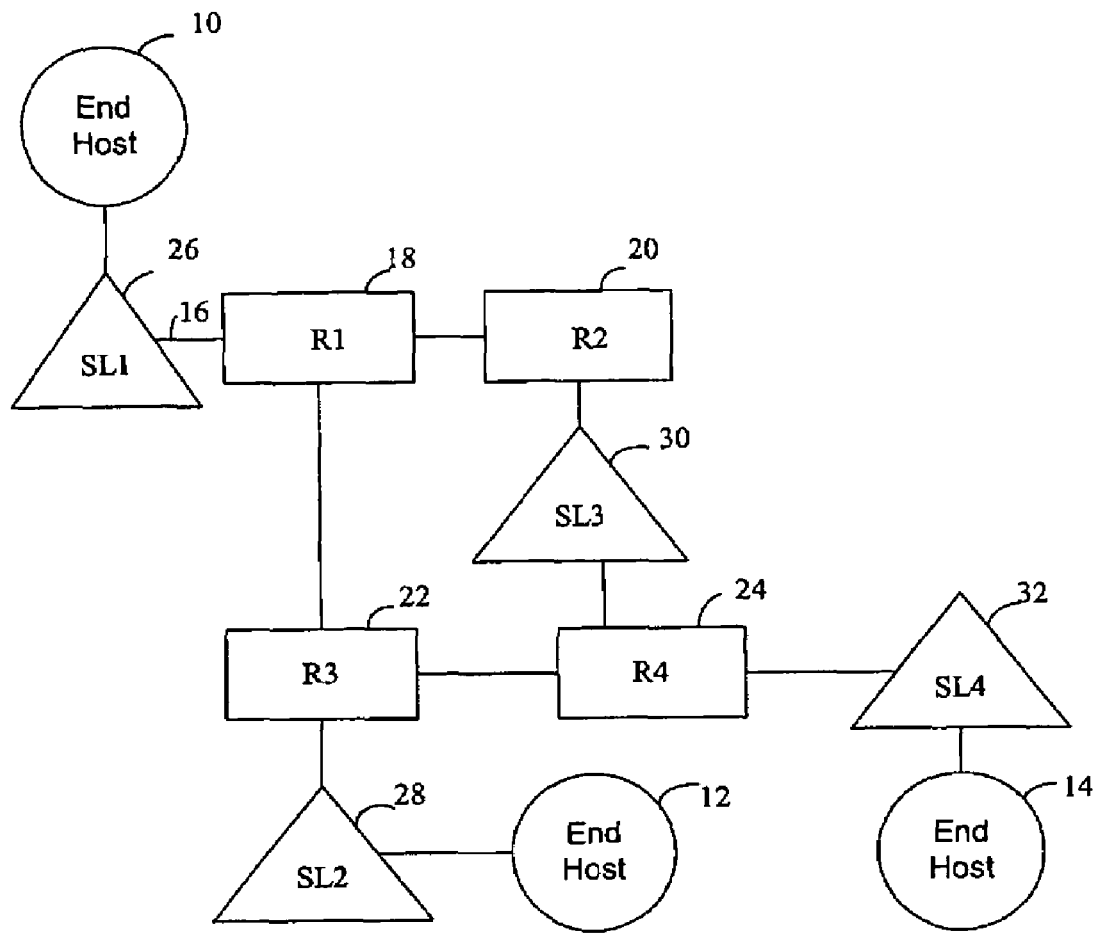
FIG. 1 is a block diagram of a computer network suitable for implementing the present invention.

FIG. 1 shows an example of a network that has redundant paths. The network is shown as populated with routers and Smartlinks and delimited by end hosts. It may also include a number of other devices not shown. The network of FIG. 1 is a simplified example of the type of network that can benefit from implementing the present invention. The present invention can be applied to networks of myriad different configurations and topologies. In one embodiment, the network devices are common commercially available Intel Pentium® II and III-based microcomputers running a Windows NT™ operating system. The microcomputers are connected in this embodiment by Ethernet and use IP (Internet Protocol messaging. The network can also support SNMP (Simple Network Management Protocol) and RMON (Remote Monitoring) network management. However, the nature of the network devices, the nature of the network connections and the nature of the network protocols may be different in order to suit the demands of particular The messaging and utilities discussed in the examples provided below are supported by many different hardware and software platforms and can easily be adapted for many more.

In FIG. 1, the network is delimited by three end hosts 10, 12, and 14. Between the end hosts are four routers 18, 20, 22, 24. Each router has at least two ports that are independently addressable and oriented toward different directions in the network. The first router is coupled to the first end host 10 at one port. It is coupled to the second and third routers respectively, at its other two ports. The second router 20 is connected to the first router 18 at one port and to the fourth router 24 at its other port. The third router 22 is connected to the first router 18, the second end host 12 and the fourth router 24 at its respective three ports. Finally, the fourth router 24 is connected to the second router 20, the third router 22 and the third end host 14 at its respective three ports. As can be seen in FIG. 1, messages from, for example, the first end host can be sent to the third end host through either the second or third router so that there is redundancy in the event that one of the paths should fail. The end hosts may be connected to other devices, to the Internet, an intranet or to some other WAN (wide area network). As mentioned above, the network configuration shown in FIG. 1 is provided as a working example only and the invention is not limited to such a network topology, scale or size.

The network of FIG. 1 has been augmented by the insertion of four Smartlinks 26, 28, 30, 32. The specific placement and number of Smartlinks can be selected based on many different criteria. More thorough results may be obtained if the Smartlinks are at the edges of the network, if the edges are known. Less traffic may be required to determine the network topology when the Smartlinks are not adjacent to each other. However, the network can also be discovered without any knowledge of the network topology and by placing the Smartlinks in random locations. The number of Smartlinks can be selected to strike a balance between cost and speed. Quicker results can be obtained with at least two Smartlinks. An overly large number of Smartlinks may burden the network with too many redundant messages. An overly small number of Smartlinks may require too many messages to determine the complete topology of the network. The Smartlinks may be unique devices dedicated to implementing the Smartlink functionality or network devices already present on the network for other purposes including routers. A unique Smartlink device can be constructed from a conventional programmable network appliance such as the Intel Pentium® II or III-based microcomputers mentioned above.

In the example of FIG. 1, the Smartlinks each have two ports and are inserted into the network connections described above. The fist Smartlink 26 is connected between the first end host 10 and the first router 18. The second Smartlink 28 is connected between the second end host 12 and the third router 22. The third Smartlink 30 is connected between the second router 20 and the fourth router 24. The fourth Smartlink 32 is connected between the third end host 14 and the fourth router 24. These locations are chosen to place the Smartlinks at the edge of the network, near the end hosts and spaced apart from each other. The Smartlinks initiate their network discovery process and report their results to a server which then compiles the results to determine the network topology. The server may be one of the three end hosts or one of the Smartlinks or another network appliance not shown in FIG. 1. For purposes of the present example, the server will be selected to be the first end host 10.

The Smartlinks can be inserted into the network without disturbing the normal operation of the network. The steps described below rely on IMCP (Internet Control Message Protocol) but can be adapted to any other protocol. For an ICMP-compliant network, no knowledge of any device, its configuration or how it operates is required. In particular, no MIB (Management Information Base) is required. Compatibility issues are completely avoided. The Smartlinks can be expanded functionally to perform other tasks, such as analyzing the capability and capacity of the network links to which they are connected and for traffic engineering.

Figure 2:
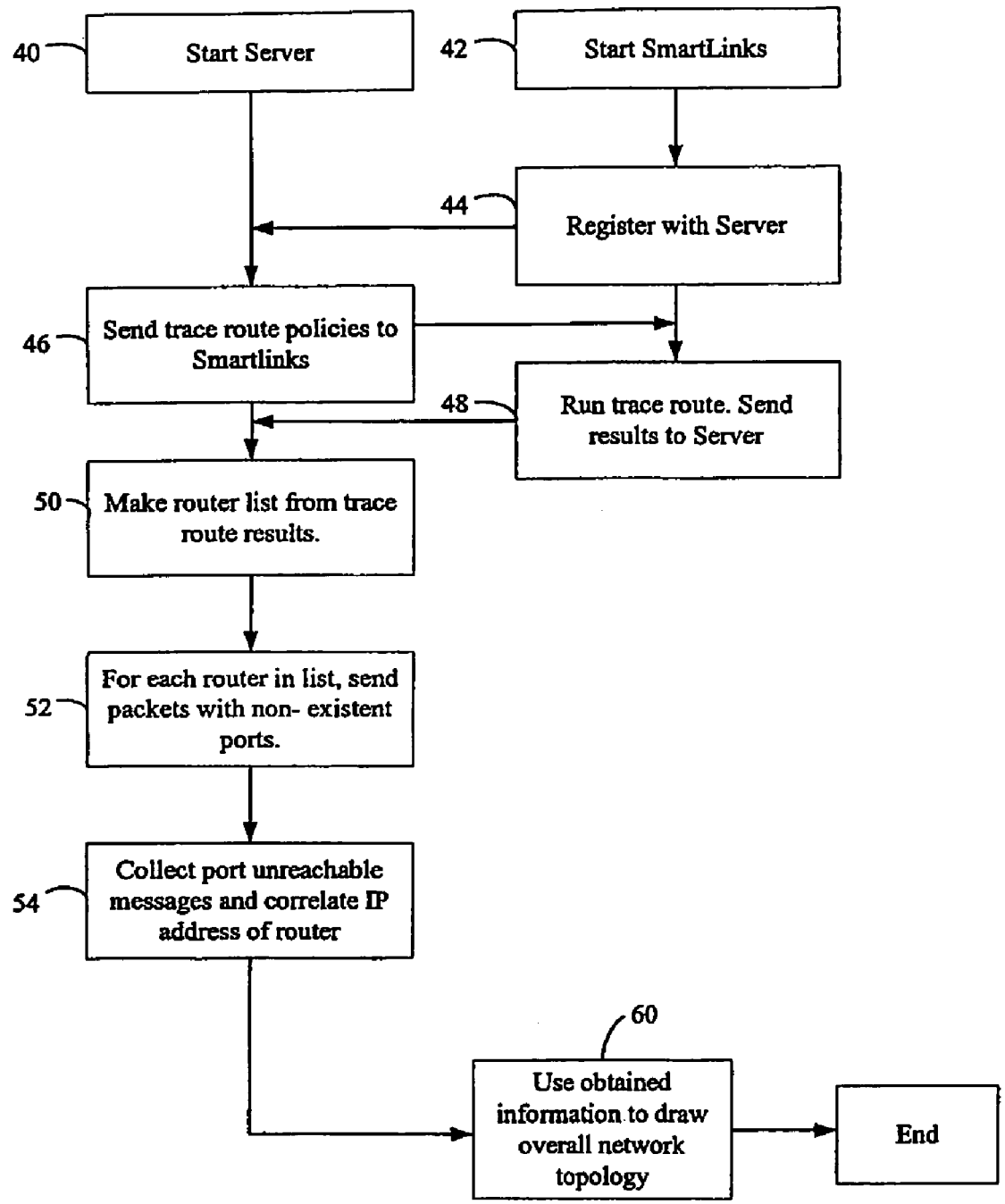
FIG. 2 is a flow chart showing a process for discovering the topology of a network according to one embodiment of the invention.

Referring to FIG. 2, the discovery of the network's topology begins, in one embodiment, with the Smartlinks 26, 28, 30, 32 which start up 42 and then register themselves 44 with the server 10. The server which has already been started up 40 receives the registrations 44 from each of the Smartlinks. In their registrations, the Smartlinks identify their IP (Internet Protocol) addresses, their port addresses (physical addresses) and an identification code. In the present example, each Smartlink has two network interfaces. This allows a Smartlink to be inserted into the network at any location. However, the number of network interfaces or ports is not important to the invention, more or fewer can be provided.

Using the registration information, the server sends Traceroute policies to each of the Smartlinks. Having the Smartlinks register themselves on startup, allows Smartlinks to be inserted into the network or taken out at any time without entering any information about the reconfiguration into the server. It also ensures that only Smartlinks capable of communicating with the server will be registered. A Smartlink coupled to a failed connection will not be able to register and the resulting topology will show a gap or end where that Smartlink is located. It is possible for all network devices to be programmed to register with the server. This can aid the server in discovering the network but will not reveal where the network connections are. In the present example, only the Smartlinks register with the server.

The Traceroute policies are addressed to each Smartlink using conventional protocols from the policy server. The policies instruct each Smartlink to run Traceroute messages to specified destinations. In one embodiment, each Smartlink is instructed to run Traceroute to each of the other Smartlinks. Typically the policies will include IP addresses for each of the Smartlinks. Further can also be sent, including the timing and order in which the messages are to be sent, the identity and addresses of other devices on the network, and the protocols or utilities to be used in sending the messages. While the present invention is described in terms of running PING and Traceroute utilities that are offered with Windows NT, other utilities can be used. Alternatively, no utility need be used, the Smartlinks can strategically send messages and wait for replies based on the network's protocols. In any event, the information will be gathered by polling all the devices between the Smartlinks and discovering how they are all connected together.

After the Smartlinks receive the policies 46, they run PING and Traceroute messages 48. PING is used to save time in determining how to direct the Traceroute packets. Consider, for example, Smartlink 1. The policy will direct it to run a Traceroute message to Smartlinks 2, 3 and 4. Starting with Smartlink 2 it must send its Traceroute message either up through one network interface or port or to the right through the other network interface as shown in FIG. 1. In one embodiment, Smartlink 1 will do both and wait for both results. However, the Traceroute message is slower and takes more system resources than a PING. So, in another embodiment, Smartlink 1 sends a PING message out both ports in both directions. The upward PING goes to the first end host 10 where it cannot be sent to any other devices and is not answered. The PING to the right, goes through the routers 18, 22 and any other devices on the network until it reaches Smartlink 2, where an answer is generated and returned to Smartlink 1. Smartlink 1 has now determined the network interface through which it should send its Traceroute message to begin discovering the connections between all the devices.

Smartlink 1, will also PING for Smartlinks 3 and 4. Smartlink 3 can be reached by Smartlink 1, both through the second router 20 and the fourth router 24, depending on the path that the PING message takes. In some networks, it may be possible for the PING to travel both paths and Smartlink 1 will receive two replies one from each port. Smartlink 3's reply will identify Smartlink 3 and the network interface of Smartlink 1 that sent the PING. This gives Smartlink 1, not only the direction to send messages to reach Smartlink 3 but also the knowledge that Smartlink 3 is accessible to it.

After PINGing the other Smartlinks, Smartlink 1 will send Traceroute messages to each of the other Smartlinks or just to the Smartlinks that the server named in its policies. As mentioned above, Traceroute is selected as a convenient way of implementing the functions that are desired to show the data paths, however, other utilities that offer the important desired functionality can be used instead. The Traceroute utility will send a message to the destination Smartlink with a low TTL (time to live) and then increment the TTL until the path is traced through the target. For the example of Smartlink 1 tracing the route to Smartlink 2, a message with a TTL of 1 will first leave the port facing the first router and expire at the first router. The first router will respond to the message, send an error report and identify itself. It will also identify an IP address of the router at the port that received the message. The message that is returned is typically a standard error message that, according to ICMP, contains all of the information that the Traceroute utility desired to obtain.

The second Traceroute message will be sent to Smartlink 2 with a TTL of two. It will make it to the third router. The message will expire at the third router after making the two hops that it takes to get there. The third router ICMP will send an error message back to Smartlink 1 identifying itself and an IP address of the port that received the message.

The third Traceroute message with TTL of three makes it to Smartlink 2 in three hops. Smartlink 2 will accordingly reply and identify itself and the IP address of the port at which the message was received. Smartlink 1 has now identified the three hops that it takes to get to Smartlink 2. It collects the Traceroute results and puts it into a table or database that it can send to server. In Windows NT, the Traceroute utility, called Tracert, provides the IP address of each device on the way to Smartlink 2 and the order in which that address was received in an error message. Instead of a database or table, Smartlink 1 can simply send this list. The result of the Traceroute runs will depend upon the utility that is selected. The format of the report of the server can be selected to optimize efficiency for the system involved. The Traceroute utility is then repeated to discover the routes to the other Smartlinks.

At the same time that Smartlink 1 is tracing the path to Smartlink 2, Smartlink 2 is tracing the path to Smartlink 1. It will find that its network interface facing the third router gets an answer from Smartlink 1 to its PING and that there are three hops from it to Smartlink 1. The hops are the third router, the first router and Smartlink 1 itself. While the results of the two Traceroute runs involve the same devices, the results are not necessarily the same because different ports are used. The list of IP addresses collected by the two Smartlinks can, accordingly, be different. Smartlinks 1 and 2 will each compile a table or database of results for the same equipment but the IP addresses may be very different.

After each Smartlink has completed all of its PING and Traceroute runs, it sends its results as a table, database, list or any other form to the server 48. The server collects the results from each Smartlink and makes a router list 50. To complete the topology, the server should correlate the different IP addresses to each router. In one embodiment, the routers support SNMP (Simple Network Management Protocol) or RMON (Remote Monitoring) and maintain a MIB (Management Information Base) that lists all of the IP addresses of the router. Accordingly, the server can query each identified router to provide a list of its IP addresses from its MIB. If the router has no MIB or the format of the MIB is not known to the server, then the server can correlate the IP addresses by sending packets with non-existent ports 52.

The server, by sending a packet to a router, using an IP address of the router but addressed to an application port that does not exist on the router will provoke an error message from the router. According to ICMP, the error message will identify, the router, the address of the interface of the router that received the message and is responding to the message, and the message itself. The server sends these packets to all of the routers for all of the IP addresses and collects the data in the error messages 54. The error messages allow the server to correlate different IP addresses of the same router to that same router. In doing so, the server collects a list of all of the source IP addresses for each router which it can then correlate to the Traceroute results.

As described above, the present invention discovers the connections of the routers. It can also rely on MIBs or similar types of tables and directories to discover any other devices. The end hosts are not discovered. The routers are discovered easily because they respond to Traceroute utilities and provide rich information under ICMP. However, the process can be adapted to provide information about other devices on the network with suitable modifications to the messages and the replies. The information that is discovered by sending messages and replies can be supplemented with any other reliable source, such as MIBs. The resulting data provides a list of all of the IP addresses of each router and all of the connections between ports as identified by IP address. From this data, a drawing, table, chart, spreadsheet or any other rendering of the network topology can be generated 60. FIG. 1 is an example of such a chart.

Figure 3:
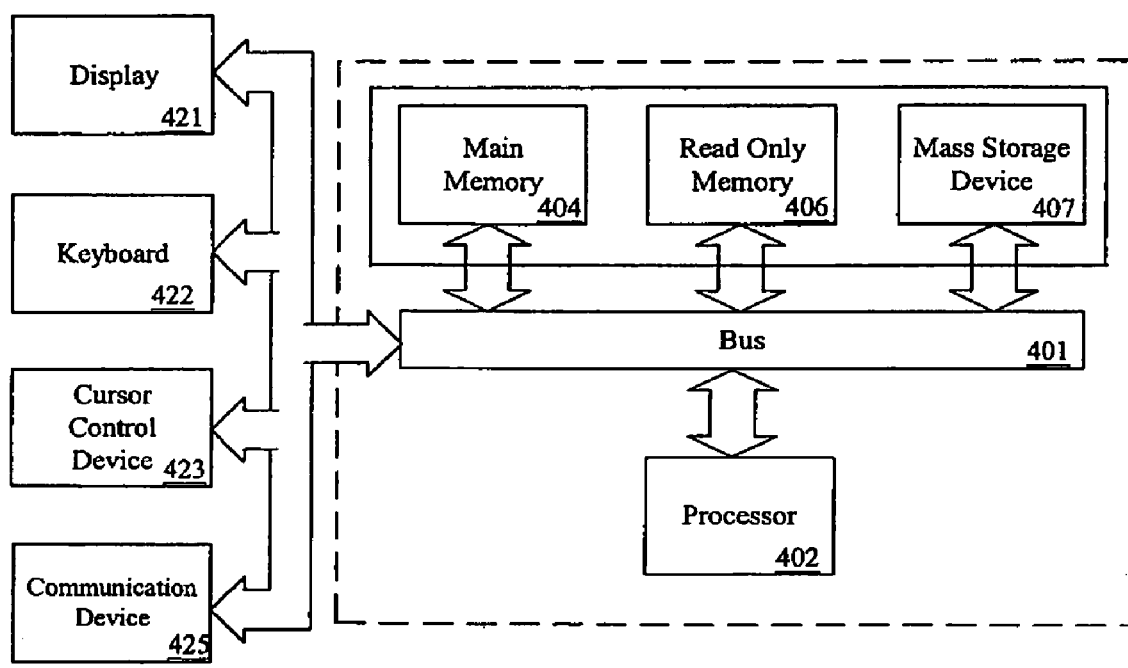
FIG. 3 is an example of a typical computer system of the network of FIG. 1.

A computer system 400 representing an example of a system upon which features of the present invention may be implemented is shown in FIG. 3. The network appliances of FIG. 1, including the Smartlinks, will typically be configured similarly to what is shown in FIG. 3. The computer system 400 includes a bus or other communication means 401 for communicating information, and a processing means such as a microprocessor 402 coupled with the bus 401 for processing information. The computer system 400 further includes a main memory 404, such as a random access memory (RAM) or other dynamic data storage device, coupled to the bus 401 for storing information and instructions to be executed by the processor 402. The main memory also may be used for storing temporary variables or other intermediate information during execution of instructions by the processor.

The computer system may also include a nonvolatile memory 406, such as a read only memory (ROM) or other static data storage device coupled to the bus for storing static information and instructions for the processor. A mass memory 407 such as a magnetic disk or optical disc and its corresponding drive may also be coupled to the bus of the computer system for storing information and instructions.

The computer system can also be coupled via the bus to a display device or monitor 421, such as a cathode ray tube (CRT) or Liquid Crystal Display (LCD), for displaying information to a user. For example, graphical and textual indications of installation status, operations status and other information may be presented to the user on the display device. Typically, an alphanumeric input device 422, such as a keyboard with alphanumeric, function and other keys, may be coupled to the bus for communicating information and command selections to the processor. A cursor control input device 423, such as a mouse, a trackball, or cursor direction keys can be coupled to the bus for communicating direction information and command selections to the processor and to control cursor movement on the display 421.

A communication device 425 is also coupled to the bus 401. The communication device 425 may include a modem, a network interface card, or other well known interface devices, such as those used for coupling to Ethernet, token ring, or other types of physical attachment for purposes of providing a communication link to support a local or wide area network (LAN or WAN), such as those used for coupling to Ethernet, token ring, or other types of physical attachment for purposes of providing a communication link to support a local or wide area network (LAN or WAN), for example. In this manner, the computer system may also be coupled to a number of clients or servers via a conventional network infrastructure, including an intranet or the Internet, for example.

It is to be appreciated that a lesser or more equipped computer system than the example described above may be preferred for certain implementations. Therefore, the configuration of the exemplary computer system 400 will vary from implementation to implementation depending upon numerous factors, such as price constraints, performance requirements, technological improvements, or other circumstances.

It should be noted that, while the steps described herein may be performed under the control of a programmed processor, such as the processor 402, in alternative embodiments, the steps may be fully or partially implemented by any programmable or hard coded logic, such as Field Programmable Gate Arrays (FPGAs), TTL logic, or Application Specific Integrated Circuits (ASICs), for example. Additionally, the method of the present invention may be performed by any combination of programmed general purpose computer components or custom hardware components. Therefore, nothing disclosed herein should be construed as limiting the present invention to a particular embodiment wherein the recited steps are performed by a specific combination of hardware components.

In the present description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. The specific detail may be supplied by one of average skill in the art as appropriate for any particular implementation.

The present invention includes various steps, which may be performed by hardware components or may be embodied in machine-executable instructions, such as software or firmware instructions. The machine-executable instructions may be used to cause a general-purpose or special-purpose processor programmed with the instructions to perform the steps. Alternatively, the steps may be performed by a combination of hardware and software.

The present invention may be provided as a computer program product that may include a machine-readable storage medium having stored instructions thereon, which may be used to program a computer (or other machine) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or any other type of medium suitable for storing electronic instructions. Moreover, the present invention may also be downloaded as a computer program product, wherein the program may be transferred from a remote computer to a requesting computer by way of data signals embodied in a carrier wave or other machine-readable propagation medium via a communication link (e.g., a modem or network connection).

Importantly, while embodiments of the present invention are described with reference to discovering the topology of servers coupled on a network communicating using ICMP, the method and apparatus described herein are equally applicable to any other type of network and to other communications protocols. In addition, while the invention has been described in terms of a wired computer network it can also be applied to wireless networks that employ point-to-point and point-to-multipoint connections.

Although this disclosure describes illustrative embodiments of the invention in detail, it is to be understood that the invention is not limited to the precise embodiments described. The specification and drawings are, accordingly, to be regarded in an illustrative rather than a restrictive sense. Various adaptations, modifications and alterations may be practiced within the scope of the invention defined by the appended claims.

What is claimed is:

1. A method comprising:
registering a first network device and a second network device to a policy server;
receiving network discovery policies from the policy server at the first and second network devices;
identifying the second network device at the first network device in accordance with the received policies by receiving an address of the second network device from a third network device, the third network device being different from the policy server;
sending a message from the first network device to the second network device, the message establishing the identity of any network device between the first network device and the second network device in accordance with the received policies; and
compiling the established identities to determine the topology of the network.

2. The method of claim 1, wherein the first network device comprises a plurality of network interfaces, the method further comprising selecting an interface to the second device by sending a packet from each of the plurality of network interfaces to an address of the second network device and selecting an interface that corresponds to any reply received from the second network device.

3. The method of claim 2, wherein sending a packet from each of the plurality of network interfaces comprises sending a PING packet from each of the plurality of network interfaces.

4. The method of claim 1, wherein sending the message comprises sending a plurality of messages to the second network device, each message having an incrementally greater time to live until a message reaches the second network device.

5. The method of claim 1, wherein sending the message comprises executing a route tracing utility at the first network device to determine the route of a packet between the first and second network device.

6. The method of claim 1, further comprising:
identifying a fourth network device at the first network device; and
sending a message from the first network device to the third network device, the message establishing the identity of any network device between the first network device and the third network device.

7. The method of claim 1, further comprising sending a packet to a fourth network device to provoke the fourth network device to identify an address corresponding to a port at which the packet was received and wherein compiling further comprises compiling the identified address.

8. The method of claim 1, further comprising sending a packet to a fourth network device addressed to a port that does not exist on the fourth network device in order to provoke the third network device to send an error message to the first network device that identifies an address of the third network device corresponding to the port at which the packet was received and wherein compiling further comprises compiling the identified address.

9. The method of claim 1, further comprising sending the established identities to the policies server in accordance with the received policy.

10. The method of claim 9 wherein compiling comprises compiling the established identities at the policy server to determine the topology of the network.

11. A machine-readable storage medium having stored thereon data representing sequences of instructions which, when executed by a machine, cause the machine to perform operations comprising:
registering a first network device and a second network device to a policy server;
receiving network discovery policies from the policy server at the first and second network devices;
identifying the second network device at the first network device in accordance with the received policies by receiving an address of the second network device from a third network device, the third network device being different from the policy server;
sending a message from the first network device to the second network device, the message establishing the identity of any network device between the first network device and the second network device in accordance with the received policies; and
compiling the established identities to determine the topology of the network.

12. The medium of claim 11, wherein the first network device comprises a plurality of network interfaces, the instructions further comprising instructions which, when executed by the machine, cause the machine to perform further operations comprising selecting an interface to the second device by sending a packet from each of the plurality of network interfaces to an address of the second network device and selecting an interface that corresponds to any reply received from the second network device.

13. The medium of claim 11, wherein the instructions for sending the message further comprise instructions which, when executed by the machine, cause the machine to perform further operations comprising sending a plurality of messages to the second network device, each message having an incrementally &eater time to live until a message reaches the second network device.

14. The medium of claim 11, further comprising instructions, when executed by the machine, cause the machine to perform further operations comprising:
identifying a fourth network device at the first network device; and
sending a message from the first network device to the third network device, the message establishing the identity of any network device between the first network device and the fourth network device.

15. The medium of claim 11, further comprising instructions which, when executed by the machine, cause the machine to perform further operations comprising sending a packet to a fourth network device to provoke the fourth network device to identify an address corresponding to a port at which the packet was received and wherein the instructions for compiling comprise further instructions which, when executed by the machine, cause the machine to perform further operations comprising compiling the identified address.

16. A method comprising:
registering a first network device and a second network device to a policy server;
receiving network discovery policies from the policy server at the first and second network devices;
identifying the second network device at the first network device in accordance with the received policies by receiving an address of the second network device from a third network device, the third network device being different from the policy server;
sending a route tracing packet from the first network device to the second network device, to determine addresses of any network device between the first network device and the second network device in accordance with the received policies; and
compiling the addresses to determine the topology of the network.

17. The method of claim 16, wherein the first network device comprises a plurality of network interfaces, the method further comprising selecting an interface to the second device by sending a PING message from each of the plurality of network interfaces to an address of the second network device and selective an interface that corresponds to any reply received to the PING message from flue second network device.

18. The method of claim 16, wherein the route tracing packet comprises a plurality of messages to the second network device, each message having an incrementally greater time to live until a message reaches the second network device.

19. The method of claim 16, further comprising sending a packet to a fourth network device addressed to a port that does not exist on the fourth network device in order to provoke the third network device to send an error message to the first network device that identifies an address of the third network device corresponding to the port at which the packet was received and wherein compiling further comprises compiling the identified address.

* * * * *

UNITED STATES PATENT AND TRADEMARK OFFICE
CERTIFICATE OF CORRECTION

PATENT NO.      : 7,263,552 B2
APPLICATION NO. : 09/822539
DATED           : August 28, 2007
INVENTOR(S)     : Govindarajan et al.

Page 1 of 1

It is certified that error appears in the above-identified patent and that said Letters Patent is hereby corrected as shown below:

In column 10, at line 4, delete "&eater" and insert --greater--.

In column 10, at line 48, delete "flue" and insert --the--.

Signed and Sealed this

Fourteenth Day of April, 2009

JOHN DOLL
*Acting Director of the United States Patent and Trademark Office*